United States Patent [19]
Chaya

[11] Patent Number: 5,818,666
[45] Date of Patent: Oct. 6, 1998

[54] LINEAR DRIVE MOTOR APPARATUS FOR ADJUSTING THE RELATIVE POSITION BETWEEN AND SECOND YOKES OF A PAIR OF MAGNETIC CIRCUITS

[75] Inventor: Masahiko Chaya, Yokohama, Japan

[73] Assignee: Canon Kabushiki Kaisha, Tokyo, Japan

[21] Appl. No.: 766,106

[22] Filed: Dec. 16, 1996

Related U.S. Application Data

[63] Continuation of Ser. No. 358,098, Dec. 16, 1994, abandoned.

[30] Foreign Application Priority Data

Dec. 21, 1993 [JP] Japan ..................................... 5-321819

[51] Int. Cl.$^6$ ................................................. G11B 21/08
[52] U.S. Cl. ......................................... 360/106; 369/215
[58] Field of Search ................................... 360/106, 109; 369/215, 219, 249; 310/12, 13

[56] References Cited

U.S. PATENT DOCUMENTS

| | | | |
|---|---|---|---|
| 4,286,298 | 8/1981 | Rinkleib | 360/106 |
| 4,812,934 | 3/1989 | Suzuki et al. | 360/106 |
| 5,138,605 | 8/1992 | Shtipelman et al. | 360/106 |
| 5,267,111 | 11/1993 | Nishimura et al. | 360/106 |

FOREIGN PATENT DOCUMENTS

04149869  5/1992  Japan ..................................... 360/106

*Primary Examiner*—Stuart S. Levy
*Assistant Examiner*—Kevin M. Watkins
*Attorney, Agent, or Firm*—Fitzpatrick, Cella, Harper & Scinto

[57] ABSTRACT

A linear motor drive apparatus for moving a head carriage in a direction perpendicular to tracks on a recording medium includes a permanent magnet, first yoke for supporting the permanent magnet, a second yoke, and a coil fixed on the head carriage and wound around the second yoke. The permanent magnet is disposed in a direction parallel to a moving direction of the head carriage. The second yoke is disposed to be spaced apart from the permanent magnet at a predetermined interval. An adjusting mechanism is provided in the apparatus so as to adjust a relative position between the first and second yokes to adjust the predetermined interval.

2 Claims, 7 Drawing Sheets

LINEAR DRIVE MOTOR APPARATUS FOR ADJUSTING THE RELATIVE POSITION BETWEEN AND SECOND YOKES OF A PAIR OF MAGNETIC CIRCUITS

This application is a continuation of Application Ser. No. 08/358,098 filed Dec. 16, 1994, now abandoned.

BACKGROUND OF THE INVENTION

1. Field of the Invention

The present invention relates to a linear motor drive apparatus for moving a head carriage in a direction perpendicular to tracks of a recording medium mainly used in a magnetooptical recording/reproducing apparatus.

2. Related Background Art

Figure 1:
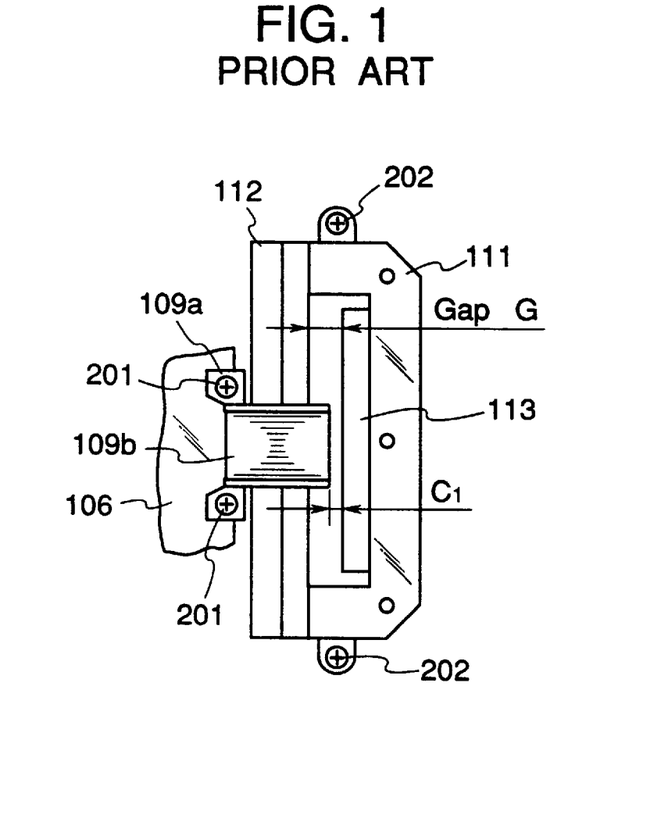
FIG. 1 is a plan view showing part of a conventional example.
Figure 2:
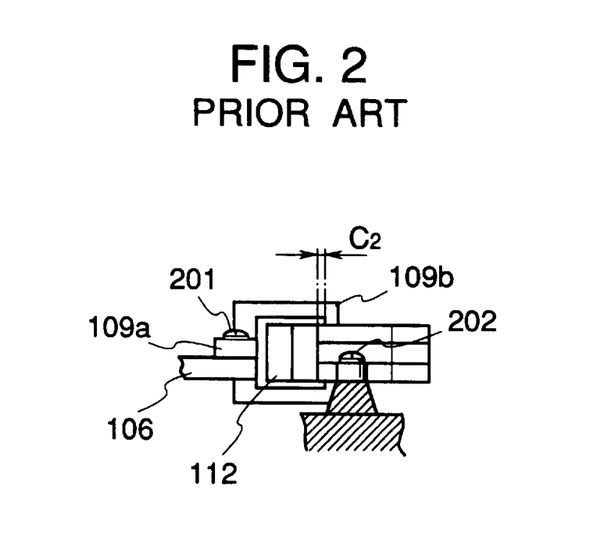
FIG. 2 is a longitudinal sectional view of the conventional example in FIG. 1.

A conventional linear motor drive apparatus shown in FIGS. 1 and 2 is known. A magnetic circuit as a main component is collectively fixed on a stationary chassis. An inner yoke 112 extends through a coil unit 109b and is engaged with a back yoke 111. Fixing on the stationary chassis with screws is performed through fixing portions 202. A bobbin which holds the coil is finally mounted on a head carriage 106 with screws 201.

In this conventional linear motor drive apparatus, a magnetic gap G is determined on the basis of the length of a relay portion of the back yoke 111 which contacts the opposing inner yoke 112, the thickness of a magnet 113, and tolerances of machining precision and assembly precision of members including a coil 109b.

The density of magnetic fluxes generated by the magnetic gap G is in inverse proportion to the size of the magnetic gap G. For this reason, when the magnetic gap G is reduced, the magnetic flux density can be increased to enhance utilization efficiency of the magnet. For this reason, the magnetic gap G must be a minimum with respect to the coil 109b.

In the conventional example, however, the size of the magnetic gap G varies depending on the range of tolerances of machining precision and assembly precision of the back yoke 111, the magnet 113, and the coil 109b. For this reason, the size cannot be simply set to a size for maximizing the utilization efficiency.

Machining precision and assembly precision may be improved to reduce the tolerances, thereby reducing the variation of the size. However, this measure leads to an increase in cost, resulting in financial inconvenience.

SUMMARY OF THE INVENTION

It is an object of the present invention to provide a linear motor drive apparatus capable of maximizing utilization efficiency of a magnet at a low cost.

In order to achieve the above object, there is provided a linear motor drive apparatus for moving a head carriage in a direction perpendicular to tracks on a recording medium, comprising:

a permanent magnet disposed in a direction parallel to a moving direction of the head carriage;

a first yoke for supporting the permanent magnet;

a second yoke disposed to be spaced apart from the permanent magnet at a predetermined interval;

a coil fixed on the head carriage and wound on the second yoke; and a mechanism for adjusting a relative position between the first and second yokes so as to adjust the predetermined interval.

The above and other objects, features, and advantages of the present invention will be apparent from the detailed description of the preferred embodiment in conjunction with the accompanying drawings.

DETAILED DESCRIPTION OF THE PREFERRED EMBODIMENT

The preferred embodiment of the present invention will be described with reference to FIGS. 3 to 6 hereinafter. A linear motor drive apparatus in a magnetooptical recording/reproducing apparatus according to the present invention shown in FIG. 3 causes a linear motor to move a head carriage 6 in a direction perpendicular to tracks on a magnetooptical recording medium (not shown) to allow an objective lens drive unit 7 to perform tracking control of the recording medium. The head carriage 6 has the objective lens drive unit 7 for performing focusing control of an objective lens 8 on the recording medium.

Figure 3:
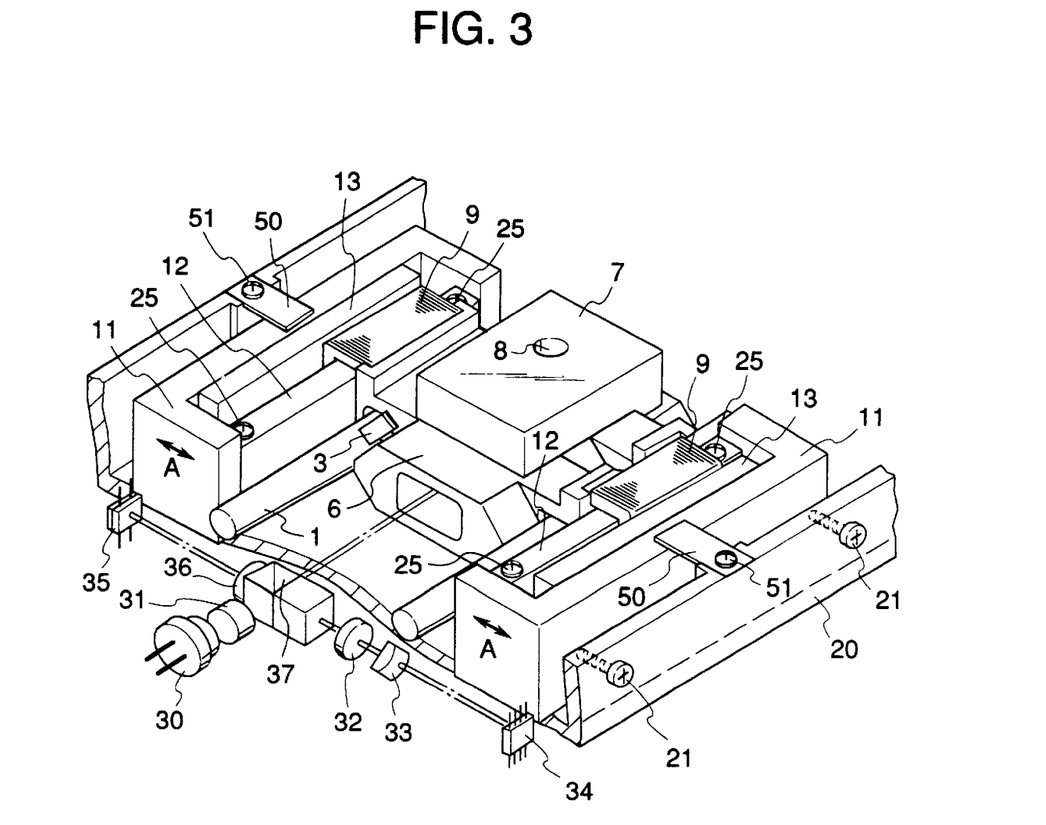
FIG. 3 is a perspective view showing an embodiment of the present invention.
Figure 4:
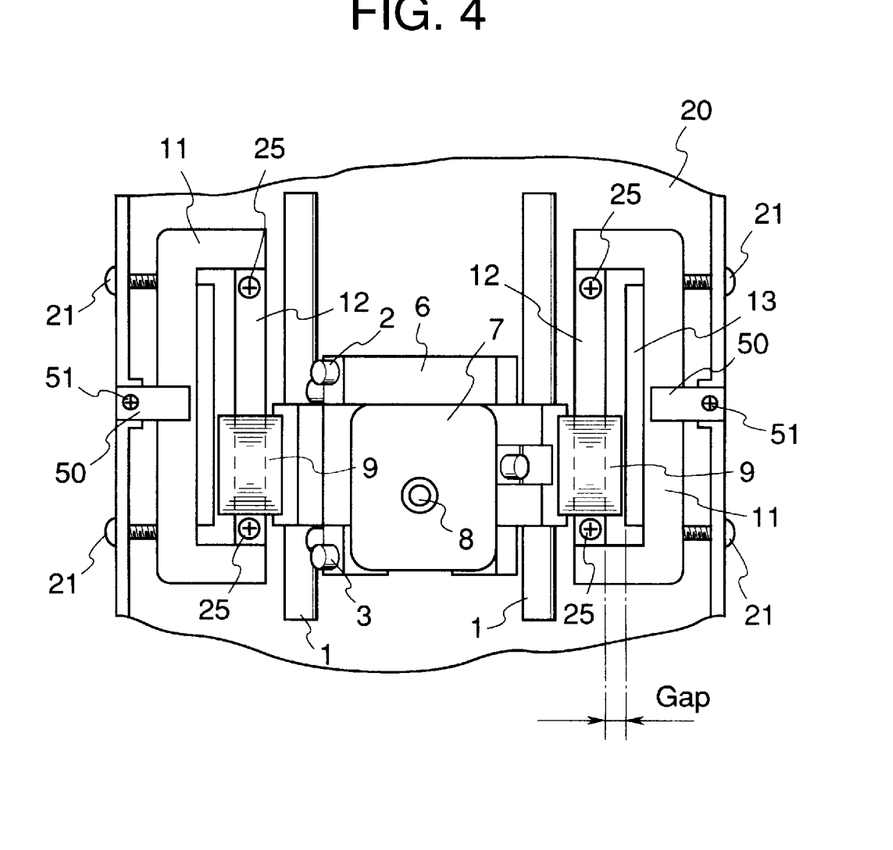
FIG. 4 is a plan view of the embodiment shown in FIG. 3.
Figure 5:
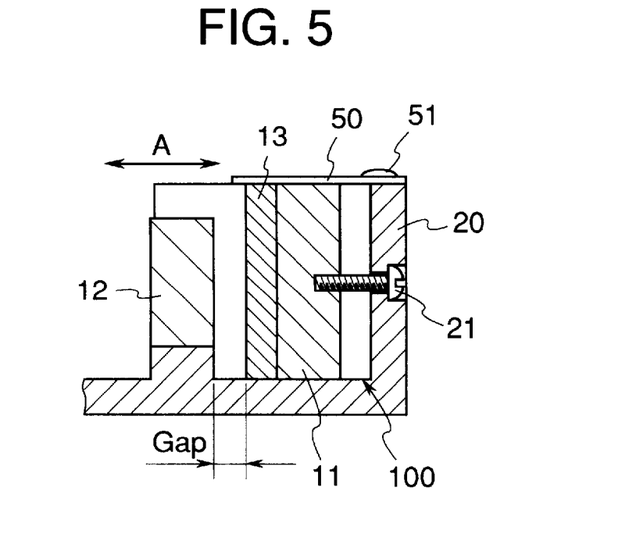
FIG. 5 is a longitudinal sectional view of the main part in FIG. 3.

Linear motor magnetic circuit magnets 13 disposed parallel to the moving direction of the head carriage 6 are mounted on a stationary chassis 20 together with corresponding back yokes 11 on the rear surfaces of the magnets 13 through position adjusting/holding means so as to adjust gaps formed between the magnets 13 and corresponding inner yokes 12 on which linear motor magnetic circuit coils 9 arranged on the head carriage 6 are respectively wound.

More specifically, the head carriage 6 is guided along a pair of right and left guide rails 1 through rollers 3. The objective lens drive unit 7 receives a laser beam from a laser source 30 on the stationary chassis 20 through an optical system including a collimator lens 31 and a polarization beam splitter 37. The objective lens drive unit 7 focuses the laser beam through the objective lens 8 on the recording medium. A beam reflected by the recording medium is guided to light-receiving elements 34 and 35 through the polarization beam splitter 37 and λ/2 plates 32 and 36.

Each inner yoke 12 is singly mounted on the stationary chassis with, e.g., screws 25. Each back yoke 11 comprises a U-shaped body having relay yokes at its two ends. Each back yoke 11 is placed on the bottom surface of the stationary chassis 20 in a state wherein the inner side surfaces of the relay yokes are in slidable contact with the two sides of the corresponding inner yoke 12. The back yokes 11 are slid along the bottom surface of the stationary chassis 20 to allow adjustment of gaps with the corresponding inner yokes 12.

Each position adjusting/holding means comprises: a holding means for holding the corresponding back yoke 11 to the stationary chassis 20 with a strength which is against a magnetic force generated by the gap in a state wherein this back yoke 11 is movable relative to the corresponding inner yoke 12 in a gap direction (indicated by arrows A); and an adjusting screw means, arranged on the stationary chassis 20 side, for pressing this back yoke 11 from its rear surface side.

Figure 6:
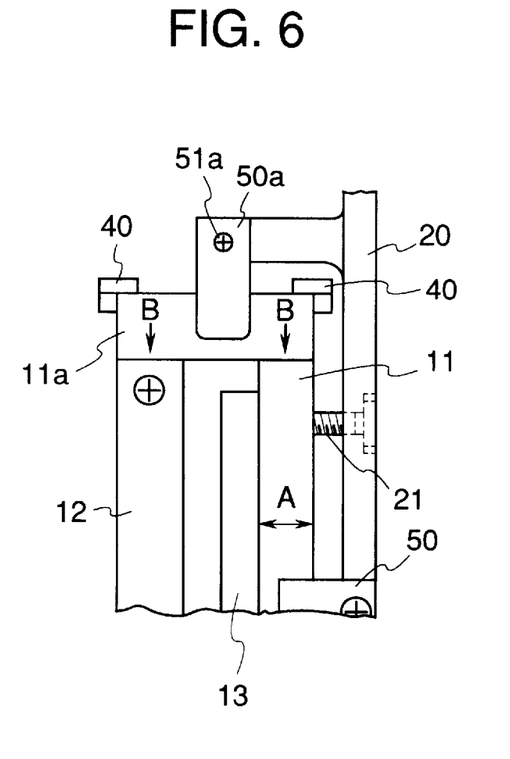
FIG. 6 is a plan view showing a modification of the main part in FIG. 3.

In this embodiment, each holding means comprises a holding member 50 such as a leaf spring for elastically performing a holding operation to clamp the corresponding back yoke 11 with the bottom surface of the stationary chassis 20. The holding members 50 are respectively fixed with screws 51 on the top portions of the two side walls of the stationary chassis 20. The holding members 50 press the corresponding back yokes 11 downward against the bottom surface of the stationary chassis by the elastic forces. More specifically, as shown in FIG. 6, as the holding means, a holding member 50a such as a leaf spring is prepared and fixed with a screw 51a to the bracket extending inward from the side wall of the stationary chassis 20. The corresponding relay yoke is elastically pressed downward against the bottom surface of the stationary chassis by the distal end of the holding member 50a. In this embodiment, regulation members 40 for inhibiting lateral movement (indicated by arrows B in FIG. 6) of the corresponding back yoke 11 extend upward from the stationary chassis 20.

In this embodiment, each adjusting screw means comprises adjusting screws 21 extending through the corresponding side wall of the stationary chassis 20 toward the rear surface of the corresponding back yoke 11. The back yokes 11 can be reciprocated in the gap direction upon threadable movement of these adjusting screws 21. In this embodiment, the distal end of each adjusting screw 21 is threadably engaged with the corresponding back yoke 11. However, if the function of pressing each back yoke 11 in the gap direction is required, each adjusting screw may be threadably engaged with the stationary chassis 20, and the corresponding back yoke 11 may be pressed by the distal end of the screw.

With the above arrangement, after a clearance between each coil 9 and the corresponding inner yoke 12 is adjusted, the inner yokes 12 are fixed on the stationary chassis 21, and the gaps between the inner yokes 12 and the magnets 13 can be adjusted by sliding the back yokes 11 upon threadable movement of the adjusting screws 21. For this reason, the gaps can be highly precisely adjusted to intervals capable of maximizing utilization efficiency of the magnets 13 with a low-cost structure independently of the machining precision and assembly precision of the back yokes 11, the magnets 13, and the coils 9.

Another structure will be supplementarily described below. In this structure, as shown in FIGS. 7 to 12, each means for holding each inner yoke 12 comprises screws 25 threadably engaged with this inner yoke 12 so as to cross the gap direction (F) and elongated holes 24 formed in the stationary chassis 20 so that the longitudinal direction of these elongated holes 24 is parallel to the gap direction (F). In a state wherein the screws 25 are threadably engaged with the elongated holes 24, the screws 25 are fastened to fix the inner yokes 12 to the stationary chassis 20.

The position adjusting means for the inner yoke 12 in this structure comprises leaf springs 22 screwed in corresponding bosses 30 on the stationary chassis 20 side and eccentric cams 23 pivotally supported on the stationary chassis 20. The eccentric cams 23 are in contact with the side surfaces of the inner yoke 12, and the inner yoke 12 is biased against the stationary chassis 20 (indicated by arrows H in FIGS. 10 and 11) by the leaf springs 22 prior to fastening of the screws 25 of the holding means. At the same time, the inner yoke 12 is biased against the eccentric cams 23 by the leaf springs 22 (indicated by arrows F in FIG. 8), and the eccentric cams 23 are pivoted (indicated by arrows G in FIG. 8), so that the position of the inner yoke 12 can be adjusted in a direction to reduce the gap (i.e., a direction opposite to the direction indicated by the arrows F; the widthwise direction of clearances C1 and C2).

Figure 7:
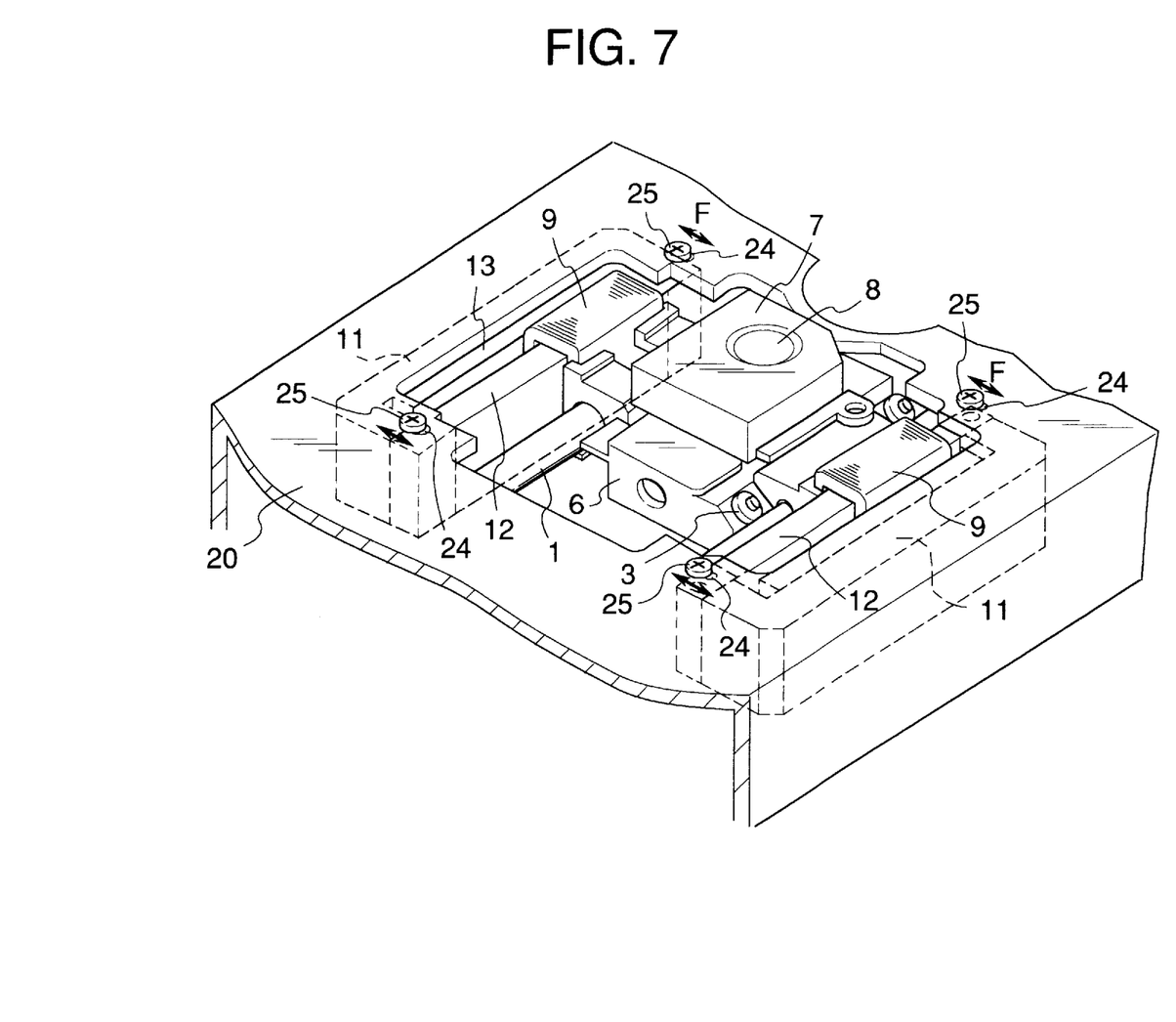
FIG. 7 is a perspective view showing another structure.
Figure 8:
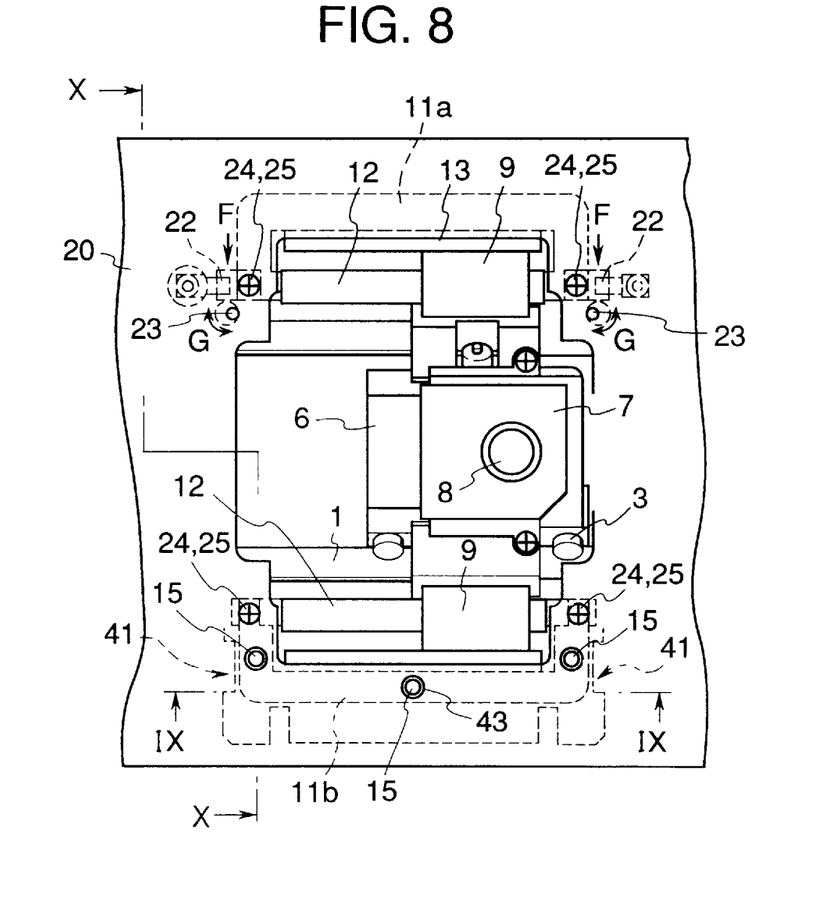
FIG. 8 is a plan view of the structure in FIG. 7.
Figure 9:
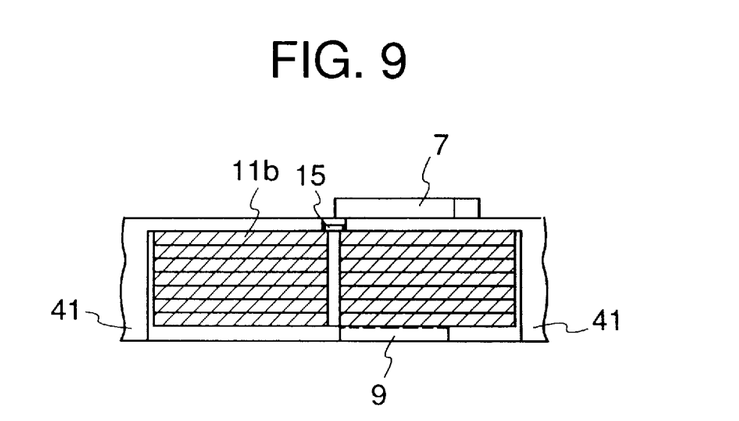
FIG. 9 is a sectional view of the structure along the line IX—IX in FIG. 8.
Figure 10:
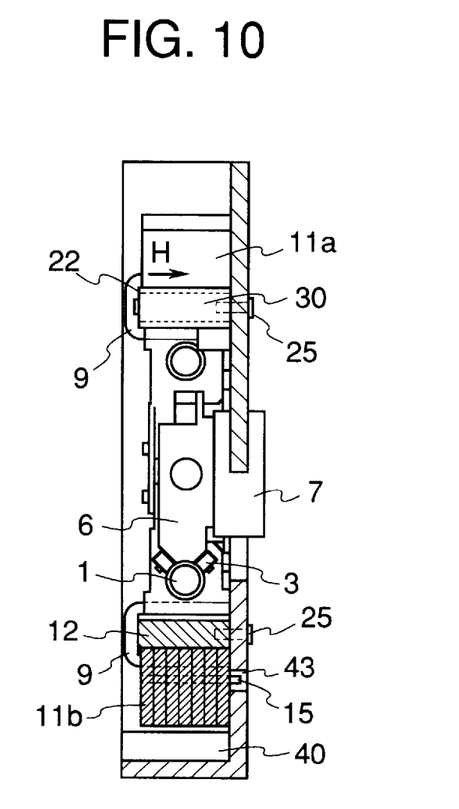
FIG. 10 is a sectional view of the structure along the line X—X in FIG. 8.
Figure 11:
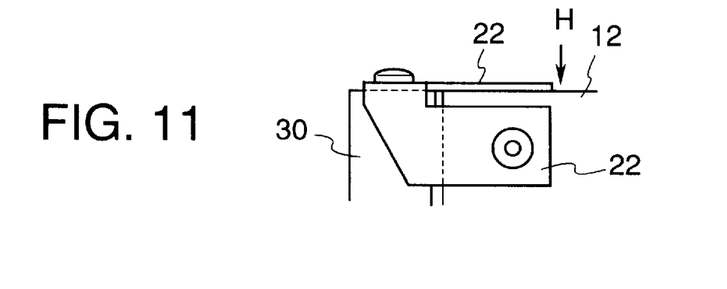
FIG. 11 is an enlarged front view of a mounting portion for a leaf spring 22 in FIG. 8.
Figure 12:
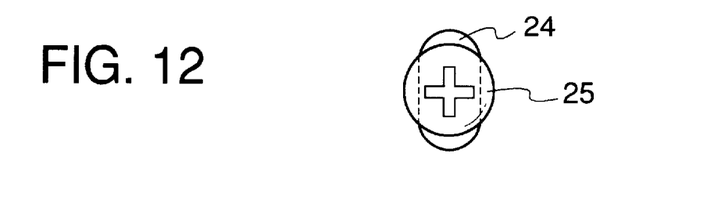
FIG. 12 is an enlarged plan view of a mounting portion for a screw 25 in FIG. 8.

In this structure, the back yoke 11 is held to be guided in the gap direction by regulation members 41 disposed on the stationary chassis 20. A relay yoke 11a is attracted to the side surface of the inner yoke 12 by an attraction force during control of a magnetic circuit. If the back yoke 11 comprises a multilayered structure consisting of plate members, fastening members 15 may be prepared and engage holes 43 formed in the stationary chassis, thereby regulating the position thereof.

What is claimed is:

1. A linear motor drive apparatus for moving a head carriage in a direction perpendicular to tracks on a recording medium, comprising:

a pair of magnetic circuits arranged at two sides along a moving direction of the head carriage, wherein each magnetic circuit of said pair of magnetic circuits comprises:

a permanent magnet disposed in a direction parallel to the moving direction of the head carriage;

a U-shaped first yoke for supporting said permanent magnet, said first yoke being adapted to be moveable;

an immoveable second yoke disposed inside said U-shaped first yoke to be spaced apart from said permanent magnet at a predetermined interval wherein inner surfaces of said U-shaped first yoke facing each other are caused to be slideably contacted with opposite ends of said second yoke;

a coil fixed on the head carriage and wound on said second yoke; and a mechanism for adjusting the predetermined interval by moving said first yoke relative to said second yoke relative position between said first and second yokes so as to adjust the predetermined interval, wherein a magnetic flux density produced between said first and second yokes is adjusted by adjusting said predetermined interval.

2. An apparatus according to claim 1, wherein said adjusting mechanism causes an adjusting screw to press against a rear surface of said first yoke, thereby moving said first yoke.

* * * * *

UNITED STATES PATENT AND TRADEMARK OFFICE
CERTIFICATE OF CORRECTION

PATENT NO. : 5,818,666

DATED : October 6,, 1999

INVENTOR(S): MASAHIKO CHAYA

It is certified that error appears in the above-identified patent and that said Letters Patent is hereby corrected as shown below:

ON COVER PAGE AT [56], REFERENCES CITED, FOREIGN PATENT DOCUMENTS

"04149869" should read --4-149869--.

ON COVER PAGE AT [54], TITLE

"BETWEEN AND" should read --BETWEEN FIRST AND--.

COLUMN 1

Title: "BETWEEN AND" should read --BETWEEN FIRST AND--.

Signed and Sealed this

First Day of June, 1999

Q. TODD DICKINSON

*Attest:*

*Attesting Officer*   Acting Commissioner of Patents and Trademarks

UNITED STATES PATENT AND TRADEMARK OFFICE
CERTIFICATE OF CORRECTION

PATENT NO. : 5,818,666

DATED : October 6, 1998

INVENTOR(S): MASAHIKO CHAYA

It is certified that error appears in the above-identified patent and that said Letters Patent is hereby corrected as shown below:

<u>ON COVER PAGE AT [56], REFERENCES CITED, FOREIGN PATENT DOCUMENTS</u>

"04149869" should read --4-149869--.

<u>ON COVER PAGE AT [54], TITLE</u>

"BETWEEN AND" should read --BETWEEN FIRST AND--.

<u>COLUMN 1</u>

Title: "BETWEEN AND" should read --BETWEEN FIRST AND--.

This certificate supersedes Certificate of Correction issued June 1, 1999.

Signed and Sealed this

Twenty-first Day of March, 2000

Attest:

Q. TODD DICKINSON

*Attesting Officer*    *Commissioner of Patents and Trademarks*